(12) United States Patent
Kanayama

(10) Patent No.: US 7,752,938 B2
(45) Date of Patent: Jul. 13, 2010

(54) CONCENTRIC DOUBLE AXIS MECHANISM HAVING BEVEL GEARS

(75) Inventor: Naoki Kanayama, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 134 days.

(21) Appl. No.: 12/077,214

(22) Filed: Mar. 18, 2008

(65) Prior Publication Data

US 2008/0236311 A1    Oct. 2, 2008

(30) Foreign Application Priority Data

Apr. 2, 2007 (JP) .............................. 2007-096269

(51) Int. Cl.
*F16H 1/14* (2006.01)
(52) U.S. Cl. ........................... 74/417; 74/89.13; 74/423
(58) Field of Classification Search ................ 74/89.13, 74/417, 500.5, 665 M, 665 GB, 423
See application file for complete search history.

(56) References Cited

U.S. PATENT DOCUMENTS

| | | | | |
|---|---|---|---|---|
| 2,978,536 A | * | 4/1961 | Doran | ........................ 358/451 |
| 4,607,538 A | * | 8/1986 | Geisthoff | ...................... 74/417 |
| 4,761,114 A | * | 8/1988 | Barland | ...................... 414/735 |
| 5,255,684 A | * | 10/1993 | Rello | .......................... 600/463 |
| 5,450,851 A | * | 9/1995 | Hancock | ..................... 600/462 |
| 2005/0011296 A1 | * | 1/2005 | Koseki | .................... 74/490.05 |

* cited by examiner

*Primary Examiner*—Richard W Ridley
*Assistant Examiner*—Matthew A Johnson
(74) *Attorney, Agent, or Firm*—Flynn, Thiel, Boutell & Tanis, P.C.

(57) ABSTRACT

In a concentric double axis mechanism (1); a driving bevel gear (7) is placed concentrically with and freely from any interference with an axis-A (3), a follower bevel gear (8) is meshed with the driving bevel gear (7), and an axis-B (9) is concentrically connected and fixed to the follower bevel gear (8). Since the driving bevel gear (7) is driven by the axis-B actuator (12) that is independent from the axis-A actuator (11), the axis-B (9) can be driven being free from any interference with the axis-A (3). The axis-A actuator (11) does not become a load for the axis-B actuator (12), nor does the axis-B actuator (12) become a load for the axis-A actuator (11).

3 Claims, 2 Drawing Sheets

CONCENTRIC DOUBLE AXIS MECHANISM HAVING BEVEL GEARS

TECHNICAL FIELD

The present invention relates to a concentric double axis mechanism having bevel gears in which an actuator for driving one axis does not become a load for another actuator that drives the other axis.

BACKGROUND ART

In a concentric double axis mechanism in which each axis (i.e., an axis-A and another axis-B) is equipped with its corresponding actuator; the actuator for driving the axis-A, for example, needs to operate while having the actuator for driving the axis-B as a load for the axis-A. The actuator for driving the axis-A bears a greater load in comparison with the actuator for driving the axis-B. In the case of high speed driving in particular, the actuator of the axis-B as the load for the actuator of the axis-A causes a great disadvantage.

DISCLOSURE OF THE INVENTION

It is an object of the present invention to provide a concentric double axis mechanism having bevel gears in which an actuator for driving one axis does not become a load for another actuator that drives the other axis.

A concentric double axis mechanism having bevel gears in accordance with the present invention includes: an axis-A; an axis-B extended in a direction that forms a prescribed angle in relation with the axis-A; a driving bevel gear which is placed concentrically and is free from any interference with the axis-A, and which is supported rotatably around a center axis line common with the axis-A; a follower bevel gear which is connected and fixed to the axis-B concentrically while meshing with the driving bevel gear; an axis-A actuator for driving the axis-A; and an axis-B actuator for driving the driving bevel gear.

According to the present invention, the driving bevel gear is so placed concentrically as to be free from any interference with the axis-A, the follower bevel gear is so placed as to mesh with the driving bevel gear, and the axis-B is concentrically connected and fixed to the follower bevel gear. Since the driving bevel gear is driven by the axis-B actuator that is independent from the axis-A actuator, the axis-B can be driven being free from any interference with the axis-A. Furthermore, the axis-A actuator does not become a load for the axis-B actuator, nor does the axis-B actuator become a load for the axis-A actuator. Accordingly, this results in an advantage in the case of high speed driving. Incidentally, the angle formed between the axis-A and the axis-B may not be right-angled but can be set optionally in accordance with the design of the bevel gears.

The concentric double axis mechanism having bevel gears may include: a frame supporting the axis-A while enabling the axis-A to rotate; an axis-A drive pulley fixed concentrically to the axis-A; an axis-B drive pulley so placed concentrically onto the axis-A as to be rotatable; an axis-A drive belt placed between an output pulley, fixed to an output shaft of the axis-A actuator, and the axis-A drive pulley; and an axis-B drive belt placed between an output pulley, fixed to an output shaft of the axis-B actuator, and the axis-B drive pulley, wherein the driving bevel gear is concentrically connected and fixed to the axis-B drive pulley.

SYMBOLS

Figure 1:
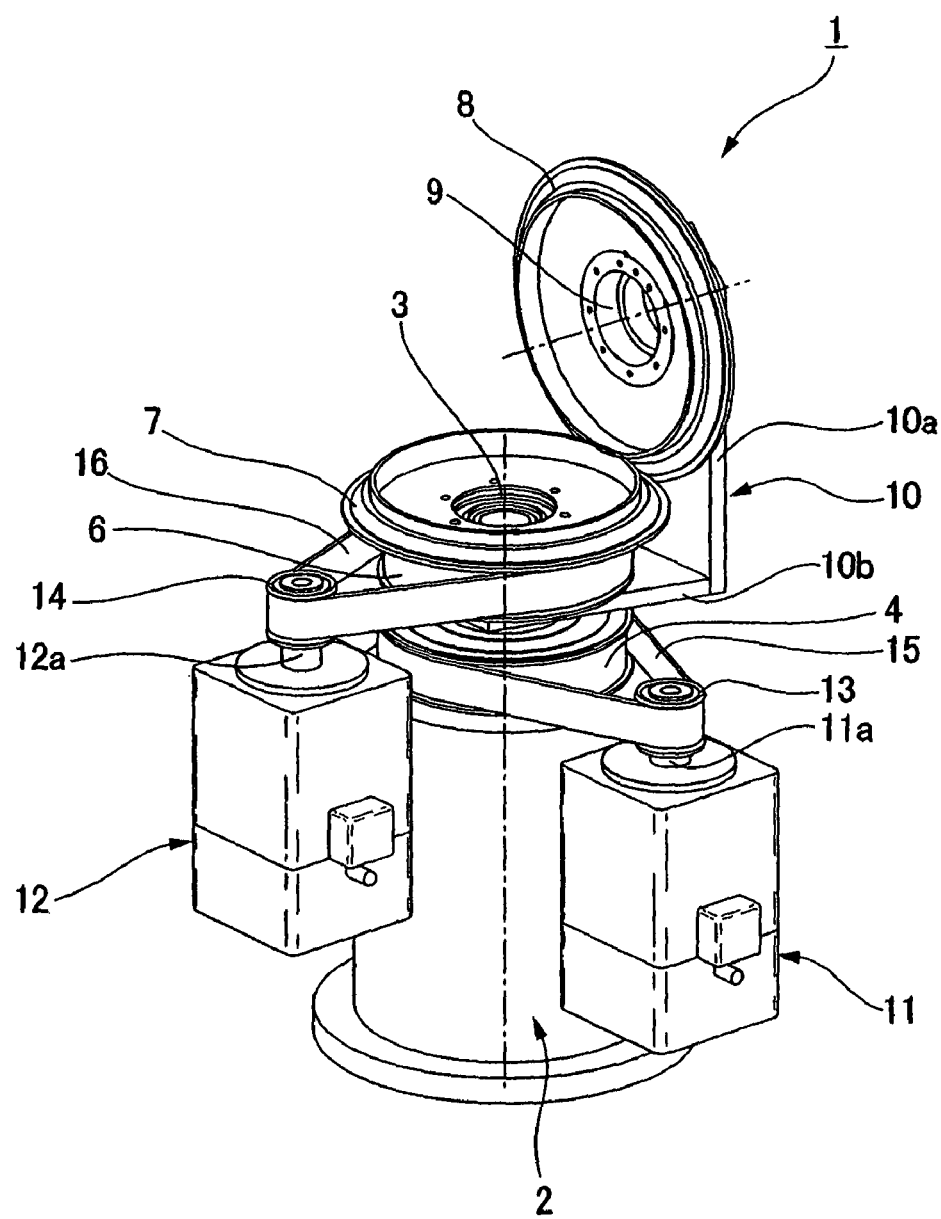
FIG. 1 is a perspective view of a concentric double axis mechanism according to the present invention.

1 Concentric double axis mechanism having bevel gears
2 Vertical frame
3 Axis-A
4 Axis-A drive pulley
6 Axis-B drive pulley
7 Driving bevel gear
8 Follower bevel gear
9 Axis-B
10 Support bracket
10a Vertical beam
10b Horizontal beam
11 Axis-A actuator
11a Output shaft
12 Axis-B actuator
12a Output shaft
13, 14 Output pulleys
15 Axis-A drive belt
16 Axis-B drive belt

BEST MODE FOR CARRYING OUT THE INVENTION

Described below with reference to the accompanying drawings is an embodiment of a concentric double axis mechanism having bevel gears according to the present invention.

Figure 2:
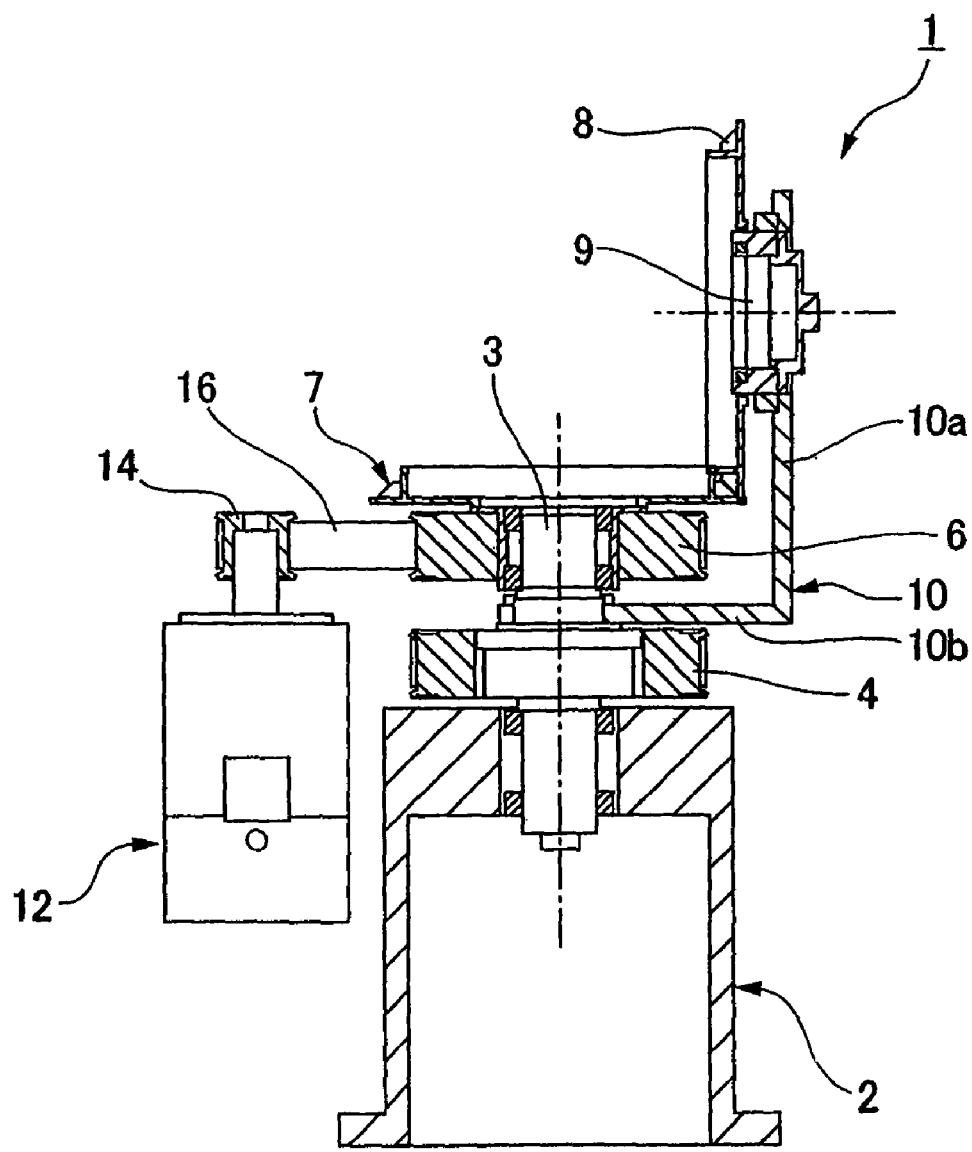
FIG. 2 is a longitudinal cross-sectional view of the concentric double axis mechanism of FIG. 1.

FIG. 1 is a perspective view of a concentric double axis mechanism having bevel gears in accordance with the present embodiment, and FIG. 2 is a longitudinal cross-sectional view thereof. A concentric double axis mechanism having bevel gears 1 (which may hereinafter be called simply "the concentric double axis mechanism 1") includes a cylindrical vertical frame 2, on the top of which an axis-A 3 is supported vertically so as to be rotatable. The axis-A 3 has a lower shaft section protruding upward from the vertical frame 2, to which an axis-A drive pulley 4 is concentrically fixed. The axis-A 3 has the top portion that supports an axis-B drive pulley 6 concentrically and rotatably via a bearing unit.

A driving bevel gear 7 is concentrically fixed to the top end of the axis-B drive pulley 6. The driving bevel gear 7 is so placed as to be free from any interference with the axis-A 3. The driving bevel gear 7 is meshed with a follower bevel gear 8 so that they are placed perpendicular with each other. Connected and fixed to the follower bevel gear 8 concentrically is an axis-B 9. The axis-B 9 is so supported as to be rotatable at a top of a vertical beam 10a of an L-shaped support bracket 10. A top of a lower horizontal beam 10b of the support bracket 10 is fixed to the axis-A 3 at a position between the axis-A drive pulley 4 and the axis-B drive pulley 6 both of which are disposed along the axis-A 3.

An axis-A actuator 11 and an axis-B actuator 12 are placed vertically beside the vertical frame 2, and are supported by supporting brackets (not shown), respectively. Output pulleys 13 and 14 are concentrically fixed to output shafts 11a and 12a of these actuators, respectively. The output pulley 13 and the output pulley 14 are so located as to have the same elevations as the axis-A drive pulley 4 and the axis-B drive pulley 6, respectively. Then, an axis-A drive belt 15 is placed between the output pulley 13 and the axis-A drive pulley 4, while an axis-B drive belt 16 is placed between the output pulley 14 and the axis-B drive pulley 6.

In the concentric double axis mechanism 1 having the structure as described above, rotation of the axis-A actuator 11 is transmitted to the axis-A drive pulley 4 through the axis-A drive belt 15, so that the axis-A 3, to which the axis-A drive pulley 4 is fixed, turns around with its center axis line as a rotation center. Meanwhile, rotation of the axis-B actuator 12 is transmitted to the axis-B drive pulley 6 through the axis-B drive belt 16, so that the driving bevel gear 7, which is concentrically connected and fixed to the axis-B drive pulley 6, turns to rotate the follower bevel gear 8 meshed with the driving bevel gear 7. As a result, the axis-B 9 concentrically connected and fixed to the follower bevel gear 8 turns around with the center axis line of the axis-B 9 as a rotation center.

Consequently, the axis-B actuator 12 for driving the axis-B 9 is not included in the load that the axis-A actuator 11 bears. Meanwhile, the axis-A actuator 11 for driving the axis-A 3 is not included in the load that the axis-B actuator 12 bears. Therefore, according to the present embodiment, a concentric double axis mechanism suitable for high speed driving can be realized.

The invention claimed is:

1. A concentric double axis mechanism comprising:
a frame;
a first rotational shaft having a central axis and being rotatably supported by said frame for rotation about the central axis;
a first drive pulley fixed concentrically to said first rotational shaft;
a first actuator including a first output pulley fixed to a first output shaft for rotation therewith, said first output shaft having an axis of rotation parallel to the central axis of said first rotational shaft;
a first drive belt connected to the first drive pulley and the first output pulley;
a second drive pulley disposed concentrically to the first rotational shaft, said second drive pulley being freely rotatable independent from the first rotational shaft;
a driving bevel gear supported concentrically on said second drive pulley free from interference with the first rotational shaft;
a second actuator including a second output shaft with a second output pulley fixed thereto for rotation therewith, said second output shaft having an axis of rotation maintained parallel to the central axis of said first rotational shaft and parallel to and spaced from the axis of rotation of said first output shaft of said first actuator;
a second drive belt connected to the second drive pulley and the second output pulley;
a second rotational shaft having a central axis;
a support bracket coacting with said frame and rotatably supporting said second rotational shaft; and
a follower bevel gear concentrically and fixedly connected to said second rotational shaft and engaged with the driving bevel gear,
wherein said first actuator rotates the first output shaft to drive the first drive belt resulting in rotation of the first drive pulley and rotation of the first rotational shaft independently from rotation of the second rotational shaft and independently from driving of the second actuator, and
wherein said second actuator rotates the second output shaft to drive the second drive belt, driving of the second drive belt resulting in rotation of the second drive pulley and the driving bevel gear, and rotation of the driving bevel gear resulting in rotation of the follower bevel gear along with the second rotational drive shaft rotatably supported by the support bracket.

2. The concentric double axis mechanism according to claim 1, wherein the central axis of the second rotational shaft is disposed perpendicular to the central axis of the first rotational shaft.

3. The concentric double axis mechanism according to claim 2, wherein the central axis of the first rotational shaft is oriented in a vertical direction and maintained by the frame parallel to the axis of rotation of the first output shaft of the first actuator.

* * * * *